J.W. SIMONTON'S
Improved
SELF-WORKING ROTARY CORN PLANTER.

99792

PATENTED FEB 15 1870

Witnesses
Orange Graves
John C. Davis

Inventor
John W. Simonton
his × mark

United States Patent Office.

JOHN W. SIMONTON, OF TAYLORSVILLE, INDIANA.

Letters Patent No. 99,792, dated February 15, 1870; antedated February 14, 1870.

IMPROVED SELF-WORKING ROTARY CORN-PLANTER.

The Schedule referred to in these Letters Patent and making part of the same.

*To all whom it may concern:*

Be it known that I, JOHN W. SIMONTON, of Taylorsville, in the county of Bartholomew, and State of Indiana, have invented a new and improved Self-Working Rotary Corn-Planter, of which the following is a full and clear description, reference being had to the accompanying drawings and letters of reference marked thereon.

The nature of my invention consists in constructing a cylinder to serve as a running gear for a planter and a receptacle for the grain, and to support a frame-work to receive the fixtures or trimmings necessary in the operation of a planter.

Figure 1:
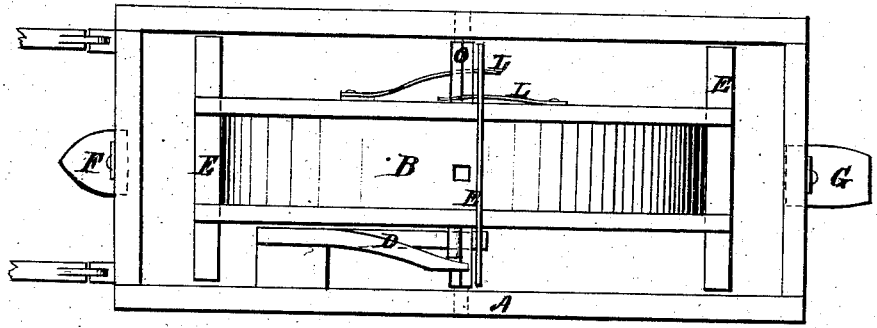
Figure 2:
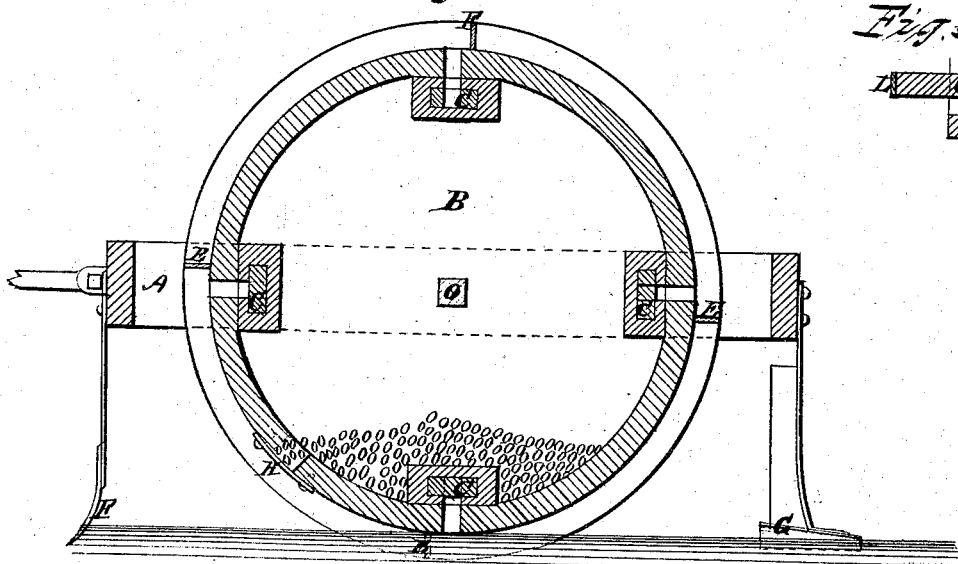
Figure 3:

Figure 1 represents a plan of my planter.
Figure 2 is a longitudinal section.
Figure 3 is a detached section of the valve.

To enable others skilled in the art to construct and use my invention, I will describe it.

A is a frame-work, supported by the cylinder B by means of a shaft, O, running through its center horizontally, journaled at both sides of the frame A.

The cylinder B is designed to receive the grain, and of sufficient size to plant any desirable distance apart, and of sufficient length to be used in a field, and not be liable to tip over sideways in its use.

The cylinder B has port-holes cut through the rim, as many or as far apart as you desire to plant.

The port-holes are opened and closed by means of valves C, by guides D, fastened to frame A.

The cylinder B has marking-bars E attached in the outer edges of its heads for the purpose of marking out the ground both ways, showing the distance planted.

The heads project from the sides all around to receive the marking bars outside of the cylinder.

At the front end of frame A is placed a shovel-point, F, for drilling at a depth desirable.

In the rear part of frame A is attached a scoop, G, to cover the grain. To the frame A, in front, can be attached a pole or thills to guide the planter by the use of one or more horses.

The seed to be planted is placed in cylinder B by removing door H, and by the revolution of the cylinder B the grain, by its own weight, remains at the lower side of the cylinder.

The operation of discharging the grain from the cylinder in planting is by means of valves C. As the cylinder revolves one end of the valves comes in contact with the guide D, and is pressed laterally by the revolution of the cylinder B, which opens the port-holes in the cylinder at a point where the ends of the valves C are at or near the lower ends of guide-bars D. The valves C are thrown back by means of spring L. The port-holes through the valves C are of sufficient size to hold several grains of corn.

The operation of guiding the planter and cross-furrowing the ground, when the first row is planted, you have your cross-furrowing for your next row; start the planter with marking-bars E in the cross-furrows, you have the furrows to guide you all the way through, planting in a direct line both ways.

Having thus fully described my invention,

What I claim, and desire to secure by Letters Patent, is—

1. The construction of a cylinder, B, in a manner to serve as a receptacle for grain and a running gear for a planter, with marking bars E for marking out the ground, constructed and arranged and operating as described, for purposes set forth.

2. The valves C, constructed and arranged within the cylinder B, substantially as shown, in combination with the guides D and springs L, as and for the purpose specified.

JOHN W. × SIMONTON.
his mark.

Witnesses:
ORANGE GRAVES,
JOHN C. DAVIS.